March 27, 1951  W. L. RIVES  2,546,782
PULLEY
Filed April 25, 1946
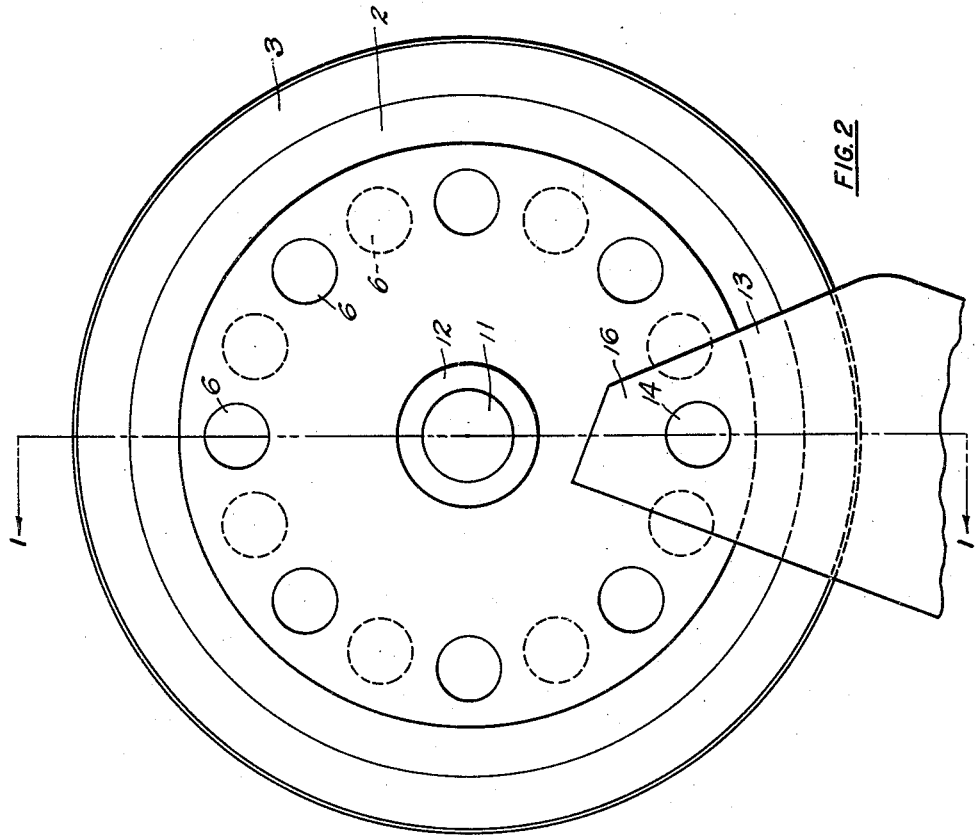
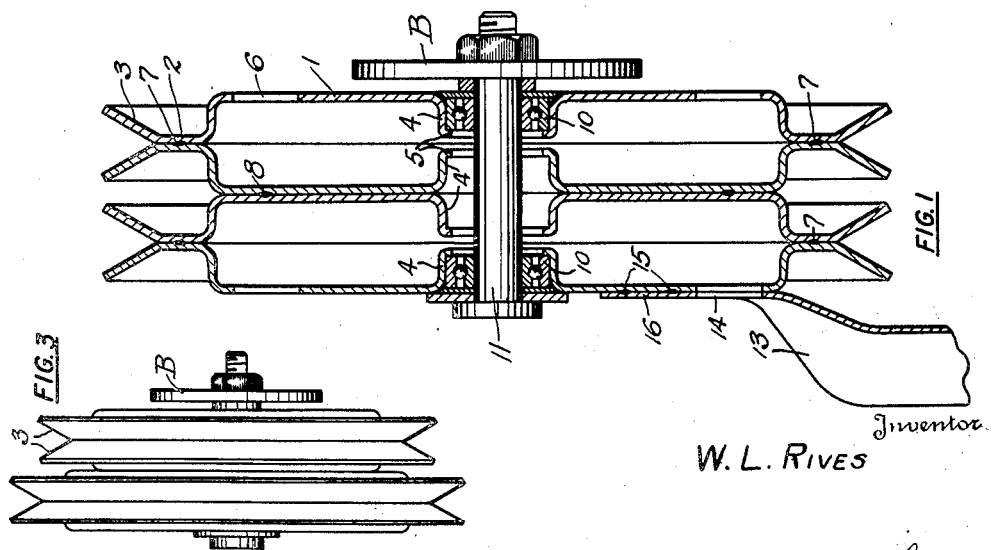
Inventor
W. L. RIVES
By Mason, Fenwick & Lawrence
Attorneys Patented Mar. 27, 1951

2,546,782

UNITED STATES PATENT OFFICE 2,546,782

PULLEY

Walter L. Rives, Jacksonville, Fla.

Application April 25, 1946, Serial No. 664,800

3 Claims. (Cl. 74—230.8)

This invention relates to pulleys.

More particularly, it relates to that type of pulleys constructed from sheet metal having its parts die pressed and secured together by welding.

An object of the invention is to provide a pulley of the type indicated, in which its component parts are of identical structure, so that these parts can be manufactured in volume and associated in pairs to form single groove pulleys and these single groove pulleys can, as desired, be associated to constitute multiple groove pulleys with any desired number of grooves.

A further object of the invention is to provide a pulley of the type indicated, in which the supporting bearings can be readily associated with the pulley regardless of the number of V-grooves involved or the axial width of the pulley.

A further object of the invention is to provide a pulley of the type indicated, of a structure permitting the association with the pulley of supplementary mechanical elements such as fan blades without interfering with the assembly of the pulley.

Further objects will more particularly appear in the course of the following detailed description.

The invention consists in the novel construction, arrangement, combinations of parts, and method hereinafter more particularly described and claimed.

One sheet of drawings accompanies this specification as part thereof, in which like reference characters indicate like parts throughout.

In the drawings, which are largely diagrammatic:

Figure 1 is a vertical transverse cross-section through the improved pulley, taken on line 1—1 of Figure 2;

Figure 2 is a face view of the pulley; and,

Figure 3 illustrates a two-groove pulley of varying diameters.

In accordance with the present invention, the pulley is constructed from a plurality of identical disk parts die stamped or otherwise formed from sheet metal or the like, in any approved manner, each of these disk elements 1 being formed with a peripheral groove 2 defining a peripheral flange 3. Each of the disks are, furthermore, provided with an inwardly directed annular flange 4 surrounding the central orifice. The inner edges of the annular flanges are inturned as at 5 for a purpose hereinafter explained. Intermediate the central annular flange 4 and the peripheral flange 2 are provided a plurality of circumferentially spaced holes 6.

It is contemplated that these disks will be manufactured in volume and in varying diameters to permit association to form any size or variety of groove pulley desired.

The pulleys are built up from such disks by associating two of such disks of the same diameter with the peripheral grooves outwardly directed and the central annular flanges inwardly directed, and securing such a pair of disks by spot welding as at 7, connecting the adjacent bottoms of the annular grooves of the disks, as is well illustrated in Figure 1. In associating the disks preliminary to welding, the holes 6 in one disk will be staggered with respect to the holes 6 in the other disk, as is illustarted in Figure 2.

With a plurality of single groove pulleys assembled in the manner indicated, multiple groove pulleys can be built up as desired from such single groove pulleys of the diameters desired, in which assembly the holes of one groove pulley will be arranged with respect to the holes in the other groove pulley, so that the welding torch can be directed through the exposed holes 6 to contact the body of the disk intermediate any two of the inner holes, as is also well illustrated in Figure 1 at points 8.

Fan blades 13 or other mechanical elements can be associated with these pulleys by being formed with an end portion 16 provided with a hole 14 adapted to overlay one of the holes 6 in a pulley, so that the stub portion 16 of the blade will not obscure any of these holes. The stub portion can then be secured to the body of the disk as by spot welding, at the points 15 as indicated in Figure 1.

Ball bearing units 10 can be seated in the annular flanges 4 of the outermost disks of the assembled pulley, as is also illustrated in Figure 1, the bearing units being drawn into their seated position in the annular flanges 4 to seat against the inturned flanges 5 as by a bolt 11, which is also used to associate the pulley with a bracket B or other support.

Modifications in the precise structure of the parts will readily suggest themselves to those skilled in the art.

Having thus fully described my invention, I claim:

1. A disk for use in association with other identical disks in the fabrication of grooved pulleys, said disk having a central hole surrounded by a cylindrical flange to constitute a seat for a bearing, said disk having a peripheral groove radially spaced from and depressed on the same side as said cylindrical flange, the peripheral groove having a flat base lying in a plane parallel with the plane of the body of the disk intermediate the central flange and peripheral groove and spaced from said plane not less than the width of said central flange, the outer wall of the peripheral groove inclining upwardly toward the plane of said body of the disk with its peripheral edge positioned intermediate the plane of the groove base and the plane of the body of the disk, the body of the disk formed with a plurality of circumferentially spaced holes, whereby the flat disk body part of one of said disks can contact throughout its area the similar part of another like disk when said disks are assembled as specified.

2. A multiple grooved pulley comprising a plurality of identical disks as specified in claim 1 arranged in pairs, one pair for each groove desired in the pulley, the disks of each pair arranged with the bottoms of the peripheral grooves in contact the outer walls of said grooves diverging to constitute a groove and with the spaced holes in their respective body parts staggered circumferentially, said pairs arranged with the confronting body portions of the disks in contact, the disks of each pair secured by circumferentially spaced spot welds between the contacting bottom portions of their peripheral grooves, and the respective pairs secured by spot welds between their contacting body portions.

3. A single groove pulley comprising two identical disks as specified in claim 1 said disks positioned with the flat bases of their peripheral grooves in contact and joined at circumferentially spaced points to make a rigid structure.

WALTER L. RIVES.

REFERENCES CITED

The following references are of record in the file of this patent:

UNITED STATES PATENTS

| Number | Name | Date |
| --- | --- | --- |
| 620,478 | Mittinger, Jr. | Feb. 28, 1899 |
| 1,161,291 | Danielson | Nov. 23, 1915 |
| 1,393,990 | Ford | Oct. 18, 1921 |